United States Patent [19]

Yoshimura et al.

[11] Patent Number: 4,482,476

[45] Date of Patent: Nov. 13, 1984

[54] FLUOROELASTOMER-CONTAINING NON-TACKY ELECTRICALLY CONDUCTIVE COATING COMPOSITION

[75] Inventors: Tatsushiro Yoshimura; Norimasa Honda; Tsutomu Terada, all of Osaka, Japan

[73] Assignee: Daikin Kogyo Co., Ltd., Osaka, Japan

[21] Appl. No.: 440,172

[22] Filed: Nov. 8, 1982

[30] Foreign Application Priority Data

Nov. 12, 1981 [JP] Japan ............................ 56-182519

[51] Int. Cl.³ ............................................. H01B 1/06
[52] U.S. Cl. ..................................... 252/511; 252/502; 252/503; 252/506; 252/507; 252/508; 252/510; 524/413; 524/436; 524/437; 524/262; 524/263; 524/264; 524/265; 524/401
[58] Field of Search ................. 252/511; 525/199, 200; 524/495, 496, 444, 439, 440, 401, 413, 520, 261, 524/262, 263, 265, 264

[56] References Cited

U.S. PATENT DOCUMENTS

| | | | |
|---|---|---|---|
| 3,991,397 | 11/1976 | King ................................. | 252/511 |
| 4,156,677 | 5/1979 | Williams et al. .................... | 524/572 |
| 4,296,151 | 10/1981 | Boultinghous ...................... | 525/356 |
| 4,328,151 | 5/1982 | Robinson ........................... | 324/495 |

*Primary Examiner*—Josephine L. Barr
*Attorney, Agent, or Firm*—Birch, Stewart, Kolasch & Birch

[57] ABSTRACT

A fluoroelastomer-containing non-tacky electrically conductive coating composition which comprises (a) a fluoroelastomer, (b) a fluororesin, (c) a coupling agent, (d) an electrically conducting material, (e) a liquid vehicle and optionally (f) an inorganic fibrous material, the weight ratio of the fluoroelastomer (a) and the fluororesin (b) being from 95:5 to 35:65, a coating film formed from which has electrical conductivity as well as the properties inherent to the fluoroelastomer.

8 Claims, No Drawings

FLUOROELASTOMER-CONTAINING NON-TACKY ELECTRICALLY CONDUCTIVE COATING COMPOSITION

The present invention relates to a fluoroelastomer-containing non-tacky electrically conductive coating composition. More particularly, it relates to a non-tacky electrically conductive coating composition which comprises a fluoroelastomer, a fluororesin, a coupling agent, an electrically conducting material, a liquid vehicle and optionally an inorganic fibrous material, the weight ratio of the fluoroelastomer and the fluororesin being within a certain specific range.

Since a fluoroelastomer has excellent resistance to heat, weather, oils, solvents and chemicals, a coating composition comprising the same is widely used for coating various kinds of substrates such as metals, plastics, rubbers, glass, ceramics, fabrics, non-woven fabrics, yarns, potteries, etc.

A conventional fluoroelastomer-containing coating film has a volume resistivity of at least $10^{10}$ Ωcm, and therefore it is usually used as an electirical insulator. Due to its electrical insulating property, it is statically electrified and its surface tends to be contaminated with dust or dirt. When a roller to be used, for example, in a copying machine is coated with the fluoroelastomer-containing coating composition, troubles are caused by repulsion or adhesion of papers. In order to avoid such troubles due to static electrification, the volume resistivity of the coating film must be reduced to $10^8$ Ωcm or less. When the volume resistivity is made $10^2$ Ωcm or less, the coating film can be used as a planar heater.

As a result of the extensive study, it has been found that the incorporation of a fluororesin together with a coupling agent into a fluoroelastomer-containing coating composition improves non-tackiness and lubricity of a surface of a coating film without any influence on its adhesiveness to the substrate and that the further incorporation of an inorganic fibrous material affords a coating film which is excellent in recovery from compression. It has also been found that the incorporation of an electrically conducting material into the fluoroelastomer-containing coating composition effectively imparts electric conductivity to the coating film without any influence on its inherent characteristics.

According to the present invention, there is provided a fluoroelastomer-containing non-tacky electrically conductive coating composition which comprises (a) a fluoroelastomer, (b) a fluororesin, (c) a coupling agent, (d) an electrically conducting material, (e) a liquid vehicle and optionally (f) an inorganic fibrous material, the weight ratio of the fluoroelastomer (a) and the fluororesin (b) being from 95:5 to 35:65.

The reason why the incorporation of the fluororesin improves the non-tackiness and lubricity of the coating film without any substantial influence on the adhesivity to the substrate as well as the mechanical properties is presumed as follows: the fluororesin which per se has non-tackiness and lubricity concentrates near the surface of the coating film so that said performances of the fluororesin appear on the surface of the coating film without reducing the adhesivity to the substrate and mechanical properties. In fact, it was confirmed by X-ray fluorometry that the fluorine content of the coating film of 50μ thick cured at 300° C. for 30 minutes at the surface is about 1.5 times that of said coating film at the bonded face to the substrate. Higher curing temperatures tend to give greater differences in the fluorine content between them.

The fluoroelastomer (a) may be a highly fluorinated elastic copolymer, preferably comprising about 40 to 85% by mol of units of vinylidene fluoride and about 60 to 15% by mol of units of at least one of other fluorine-containing ethylenically unsaturated monomers copolymerizable therewith. As the fluoroelastomer (a), there may be also used any fluorine-containing rubber bearing iodine on the polymer chain, preferably an elastic copolymer which bears about 0.001 to 10% by weight, particularly about 0.01 to 5% by weight of iodine, and comprises about 40 to 85% by mol of units of vinylidene fluoride and about 60 to 15% by mol of units of at least one of other fluorine-containing ethylenically unsaturated monomers copolymerizable therewith (cf. Japanese Patent Publication (unexamined) No. 40543/1977). Specific examples of the fluorine-containing ethylenically unsaturated monomers as above stated are hexafluoropropylene, pentafluoropropylene, trifluoroethylene, trifluorochloroethylene, tetrafluoroethylene, vinyl fluoride, perfluoro(methyl vinyl ether), perfluoro(ethyl vinyl ether), perfluoro(propyl vinyl ether), etc. Among various fluoroelastomers, preferred are vinylidene fluoride/hexafluoropropylene copolymer, vinylidene fluoride/tetrafluoroethylene/hexafluoropropylene terpolymer, etc.

Generally, the fluoroelastomer is used in the form of an aqueous dispersion. The aqueous dispersion may be an emulsion comprising the fluoroelastomer, which is obtainable by emulsion polymerization of the said monomers. Alternatively, the aqueous dispersion may be one obtained by subjecting the said monomers to suspension or bulk polymerization and dispersing the produced fluoroelastomer into an aqueous medium, if necessary, with previous pulverization and/or by the aid of any surfactant. The aqueous dispersion may contain from 10 to 70% by weight, preferably from 30 to 60% by weight of the fluoroelastomer. Such concentration can be suitably controlled by concentration or dilution. In addition to the surfactant, other conventional additives such as pigments, acid acceptors and fillers may be incorporated into the aqueous dispersion.

As the fluororesin (b), there are usable polytetrafluoroethylene, copolymers of tetrafluoroethylene and at least one of other ethylenically unsaturated monomers such as olefins (e.g. ethylene, propylene), haloolefins (e.g. hexafluoropropylene, vinylidene fluoride, chlorotrifluoroethylene, vinyl fluoride) and perfluoro(alkyl vinyl ethers), polychlorotrifluoroethylene, polyvinylidene fluoride, etc. Preferred fluororesins are polytetrafluoroethylene, copolymers of tetrafluoroethylene and at least one of hexafluoropropylene, perfluoro(methyl vinyl ether), perfluoro(ethyl vinyl ether) and perfluoro(propyl vinyl ether), usually the content of the latter monomers being not more than 40% by mol based on tetrafluoroethylene, etc.

The coupling agent may be defined as a compound that acts on an interface of an organic material and an inorganic material and forms strong chemical or physical bonding between them. Such compound usually comprises silicone, titanium, zirconium, hafnium, thorium, tin, aluminum or magnesium and bears groups that can bond the organic material and the inorganic material. Preferred coupling agents are silane coupling agents, and orthoacid esters of transition metals of Group IV in the periodic table (e.g. titanium and zirconium) and derivatives thereof. Particularly preferred are aminosilane compounds.

The silane coupling agent may be represented by the formula:

$$R^1SiR^2_{3-a}R^3_a \quad (I)$$

wherein $R^1$ is alkyl having at least one substituent selected from the group consisting of chlorine, amino, aminoalkyl, ureido, glicydoxy, epoxycyclohexyl, acryloyloxy, methacryloyloxy, mercapto and vinyl, or vinyl; $R^2$ and $R^3$ are each chlorine, hydroxy, $C_1$-$C_{10}$ alkoxy, $C_2$-$C_{15}$ alkoxy substituted alkoxy, $C_2$-$C_4$ hydroxyalkyloxy, or $C_2$-$C_{15}$ acyloxy; and a is 0, 1 or 2.

Specific examples of the group $R^1$ are β-aminoethyl, γ-aminopropyl, N-(β-aminoethyl)-γ-aminopropyl, γ-ureidopropyl, γ-glycidoxypropyl, β-(3,4-epoxycyclohexyl)ethyl, γ-acryloyloxypropyl, γ-methacryloyloxypropyl, γ-mercaptopropyl, β-chloroethyl, γ-chloropropyl, γ-vlnylpropyl and vinyl.

Preferred examples of the silane coupling agent are γ-aminopropyltriethoxysilane, N-β-aminoethyl-γ-aminopropyltrimethoxysilane, N-(trimethoxysilylpropyl)ethylenediamine, N-β-aminoethyl-γ-aminopropylmethyldimethoxysilane, γ-ureidopropyltriethoxysilane, β-aminoethyl-β-aminoethyl-γ-aminopropyltrimethoxysilane γ-glycidoxypropyltrimethoxysilane, β-(3,4-epoxycyclohexyl)ethyltrimethylsilane, γ-methacryloxypropyltrimethoxysilane, γ-mercaptopropyltrimethoxysilane, γ-chloropropyltrimethoxysilane, vinyl-tris(β-methoxyethoxy)silane, vinyltriethoxysilane, vinyltrichlorosilane, vinyltriacetoxysilane, etc. Among them, the first six compounds are most preferred since they not only serve as a vulcanizing agent of the fluororelastomer but also improve the adhesivity of the coating film to the substrate and further they have no substantial influence on the liquid vehicle.

The compound of titanium, zirconium, hafnium or thorium as the coupling agent (c) may be a orthoacid ester represented by the formula:

$$T(OR)_4 \quad (II)$$

wherein T is titanium, zirconium, hafnium or thorium; and R is alkyl, cycloalkyl or aryl, or its drivatives which is derived by reacting the orthoacid ester (II) and at least one compound having at least one functional group. Specific examples of such compound having the functional group(s) are polyhydric alcohols (e.g. glycerol, ethylene glycol, 1,3-butanediol, 2,3-butanediol, hexylene glycol, octylene glycol, etc.), oxyaldehydes (e.g. salicylaldehyde, glycose, etc.), oxyketones (e.g. diacetone alcohol, fructose, etc.), oxycarboxylic acids (e.g. glycolic acid, lactic acid, dioxymaleic acid, citric acid, etc.), diketones (e.g. diacetylacetone, etc.), ketonic acids (e.g. acetoacetic acid, etc.), ethers of ketonic acids (e.g. ethyl acetoacetate, etc.), oxyamines (e.g. triethanolamine, diethanolamine, etc.), and oxyphenols (e.g. catechol, pyrogallol, etc.).

Specific examples of the compound (II) in which T is titanium are tetraalkyl titanate (e.g. tetraethyl titanate, tetraisopropyl titanate, tetrabutyl titanate, etc.), tetraethylene glycol titanate, triethanolamine titanate, titanium acetylacetonate, isopropyltrioctanoyl titanate, isopropyltrimethacryl titanate, isopropyltriacryl titanate, isopropyltri(butyl methylpyrophosphate)titanate, tetraisopropyldi(dilaurylphosphate)titanate, dimethacryloxyacetate titanate, diacryloxyacetate titanate, di(dioctylphosphate)ethylene titanate, etc.

The compound (II) in which T is zirconium may be that corresponding to the titanium compound as described above. Its specific examples are tetraalkyl zirconate (e.g. tetraethyl zirconate, tetrabutyl zirconate, etc.), n-propyl zirconate, isopropyl zirconate, n-butyl zirconate, isobutyl zirconate, zirconium acetylacetonate, etc.

The compound (II) in which T is hafnium or thorium may be that corresponding to the titanium or zirconium compound as described above.

The tin compound as the coupling agent (c) may be an organic or inorganic compound such as $SnCl_4$.

Specific examples of the aluminum compound as the coupling agent (c) are aluminum isopropylate, mono-sec-butoxyaluminum diisopropylate, aluminum sec-butylate, ethylacetoacetatealuminum diisopropylate, aluminum tris(ethylacetoacetate), etc.

Specific examples of the magnesium compound as the coupling agent (c) are magnesium alcoholates (e.g. magnesium methylate, magnesium ethylate, etc.).

The electrically conducting material may be a conventional one such as carbon, graphite, metals and an antistatic agent. The carbon includes electrically conducting carbon, i.e. channel black, furnace black and thermal black. The metals include gold, silver, copper, aluminum and titanium. The antistatic agent includes anionic, nonionic, cationic and amphoteric antistatic agents. These materials can be used alone or in combination.

The liquid vehicle (e) may be an organic solvent such as lower ketones, lower esters and cyclic ethers, water and a mixture of water and a water-miscible arganic solvent. Examples of the water-miscible organic solvent include alcohols such as methanol, ethanol, propanol, ethylene glycol, carbitol and cellosolve.

In addition to the above essential components (a) to (e), the coating composition of the invention may comprise optionally the inorganic fibrous material. Inclusion of the inorganic fibrous material is preferred for enhancing the recovery from compression of the coating film. Examples of the inorganic fibrous material are glass fibers, carbon fibers, asbestos fibers, fibrous potassium titanate, etc. The average length of the inorganic fibrous material may be at least 1μ, preferably from 1 to 100μ.

The amine compound having at least one terminal amino group directly bonded to an aliphatic hydrocarbon group, which serves as a curing agent of the fluorine-containing rubber and also improves the mechanical properties of the coating film, may be incorporated in the coating composition as an optional component. Specific examples of the amine compound include monoamines (e.g. ethylamine, propylamine, butylamine, benzylamine, allylamine, n-amylamine, ethanolamine), diamines (e.g. ethylenediamine, trimethylenediamine, tetramethylenediamine, hexamethylenediamine, 3,9-bis(3-aminopropyl)-2,4,8,10-tetraoxaspiro-[5.5]undecane and polyamines (e.g. diethylenetriamine, triethylenetetraamine, tetraethylenepentaamine, pentaethylenehexaamine). Among them, those having at least two terminal amino groups are particularly preferred.

The coating composition of the invention may be prepared, for instance, by adding the electrically conducting material and, if necessary, the amine comound to a mixture of the aqueous dispersions of the fluoroelastomer and of the fluororesin, followed by agitation to make a uniform mixture. A surfactant may be used in this preparation step. Optional additives such as a pigment, an acid acceptor and a filler may be added previously to the mixture of the aqueous dispersions and/or ultimately to a mixture of the other components.

The weight ratio of the fluoroelastomer and the fluororesin may be usually from 95:5 to 35:65. When the content of the fluororesin is less than the lower limit, the non-tackiness and/or lubricity of the coating film are not satisfactorily improved. When the content is more than the upper limit, the coating film having a desired thickness is hardly obtainable and cracks or pinholes tend to be formed.

The amount of the electrically conducting material may vary with fields of application of the coating composition and the kind of the material, but the material must be added to the coating composition so as to provide the coating film having $10^8$ Ωcm or less of the volume resistivity in case of antistatic use or $10^2$ Ωcm or less of the volume resistivity in case of the planar heater. The amount of the material can be easily determined by those skilled in the art.

The amount of the coupling agent may be usually from 1 to 50 parts by weight, preferably from 1 to 20 parts by weight to 100 parts by weight of the fluoroelastomer. When the amine compound is added, the total amount of the coupling agent and the amine compound may be within the above range, the molar ratio of the former to the latter being from 1:99 to 99:1.

The acid acceptor as one of the optional components may be any conventional one as used in curing the fluoroelastomer. Examples are oxides and hydroxides of divalent metals (e.g. magnesium, calcium, zinc, lead). As the filler, there may be exemplified silica, clay, diatomaceous earth, talc, carbon, etc.

The coating composition of the invention may be applied onto a substrate by a conventional procedure (e.g. brushing, dipping, spraying) and cured at a temperature usually of from room temperature to 400° C., preferably of from 100° to 400° C. for an appropriate period of time to give a coating film. Preferably, the thickness of the thus coated film is at least 5µ. When the thickness is less than 5µ, the film becomes uneven and some parts of the substrate may be not coated with the film.

The thus coated film has electrical conductivity as well as the properties inherent to the fluoroelastomer, for example, heat resistance, weather resistance, abrasion resistance, oil resistance and chemical resistance, and also has excellent adhesivity to the substrate and good mechanical properties, particularly tensile strength. Further, the coating film is provided with non-tackiness and lubricity at the surface.

Accordingly, the coating composition of the invention can be used effectively to make a non-tacky electrically conductive coating film. For example, the coating composition of the invention may be applied to various electrical components (e.g. an electrically conductive packing, a sensor of a pinhole tester, an electrode for a measuring apparatus, parts for preventing interference of high-frequency), a solder substitute, a printed circuit board, a condenser, a fixed or variable resistor, a piezoelectric or photoelectric element, a sealing of an electronic element, a conveyer belt which is used in a powder producing factory, a factory where dust is generated and an operating theater, a subheater for a thermostat, a resistance wire, a spot welder, a non-conductor deposition and various rollers made of rubber or resin, and also used as a planar heater.

The present invention will be illustrated in detail by the following Examples wherein % and parts are by weight unless otherwise indicated.

EXAMPLES 1 TO 6 AND COMPARATIVE EXAMPLES 1 AND 2

The following composition A of which formulation is shown in Table 1 (100 parts) and the following composition B (5 parts) were homogeneously mixed and filtered through a 200 mesh wire mesh to prepare an aqueous fluoroelastomer-containing coating composition:

| Composition A |
| --- |
| (1) Aqueous dispersion of fluoroelastomer[*1] (the elastomer content being 60%, and Nonion HS-208 being contained) |
| (2) Aqueous dispersion of fluororesin[*2] (the resin content being 50%, and Nonion HS-208 being contained) |
| (3) Magnesium oxide |
| (4) Electrically conducting material[*3] |
| (5) Nonion HS-210 |
| (6) Water |

Note:
[*1]Vinylidene fluoride/tetrafluoroethylene/hexafluoropropylene elastic terpolymer.
[*2]Tetrafluoroethylene/hexafluoropropylene copolymer.

| Composition B | Parts |
| --- | --- |
| γ-Aminopropyltriethoxysilane | 40 |
| 3,9-Bis(3-aminopropyl)-2,4,8,10-tetraoxaspiro[5.5]undecane | 20 |
| Water | 40 |

The thus prepared coating composition was spray coated on an aluminum plate (100 mm × 50 mm × 1 mm) which had been degreased with acetone, dried at a temperature of 50° to 70° C. for 10 minutes to form a film of 30µ thick and cured at 300° C. for 10 minutes.

Volume resistivity of the cured film was measured by a fall-of-potential method, and also contact angle of water against the cured film was measured by dropping a drop of purified water on the surface at 24° C. with a goniometer (Elma Kogaku Kabushikikaisha).

The results are shown in Table 1.

TABLE I

| | Comparative Examples | | Examples | | | | | |
| --- | --- | --- | --- | --- | --- | --- | --- | --- |
| | 1 | 2 | 1 | 2 | 3 | 4 | 5 | 6 |
| Composition A | | | | | | | | |
| Aqueous dispersion of fluoroelastomer | 166 | 166 | 166 | 166 | 166 | 166 | 166 | 166 |
| Aqueous dispersion of fluororesin | 0 | 150 | 150 | 150 | 150 | 150 | 150 | 150 |
| Magnesium oxide | 3 | 3 | 3 | 3 | 3 | 3 | 3 | 3 |
| Electrically | 0 | 0 | 2 | 2.5 | 3 | 5 | 10 | 20 |

TABLE I-continued

|  | Comparative Examples 1 | Comparative Examples 2 | Examples 1 | Examples 2 | Examples 3 | Examples 4 | Examples 5 | Examples 6 |
|---|---|---|---|---|---|---|---|---|
| conducting material |  |  |  |  |  |  |  |  |
| Nonion HS-210 | 2 | 2 | 2 | 2 | 2 | 2 | 2 | 2 |
| Water | 50 | 50 | 50 | 50 | 50 | 50 | 50 | 50 |
| Volume resistivity (Ωcm) | $1.0 \times 10^{11}$ | $1.1 \times 10^{11}$ | $1.9 \times 10^{3}$ | $2.7 \times 10^{2}$ | $1.2 \times 10^{2}$ | $2.2 \times 10^{1}$ | $1.7 \times 10^{1}$ | $1.2 \times 10^{0}$ |
| Contact angle (°) | 80 | 110 | 109 | 109 | 109 | 108 | 107 | 107 |

EXAMPLES 7 AND 8

In the same manner as in Example 1 but using di-n-butoxybis(triethanolamine)titanate (in Example 7) or a zirconium chelate which had been prepared by reacting zirconium tetraisopropoxide (327 parts) and lactic acid (180 parts) at a temperature of from 25° to 50° C. and evaprating off isopropanol under reduced pressur in place of γ-aminopropyltriethoxysilane, a fluoroelastomer-containing coating composition was prepared.

A coating film was formed from the coating composition, and volume resistivity of the cured film and contact angle of water against the cured film were measured according to the same procedures as used in Example 1. The results are shown in Table 2.

TABLE 2

|  | Examples 7 | Examples 8 |
|---|---|---|
| Composition A |  |  |
| Aqueous dispersion of fluoroelastomer | 166 | 166 |
| Aqueous dispersion of fluororesin | 150 | 150 |
| Magnesium oxide | 3 | 3 |
| Electrically conducting material | 2.5 | 2.5 |
| Nonion HS-210 | 2 | 2 |
| Water | 50 | 50 |
| Volume resistivity (Ωcm) | $5.3 \times 10^{2}$ | $6.7 \times 10^{2}$ |
| Contact angle (°) | 108 | 108 |

What is claimed is:

1. A fluoroelastomer-containing non-tacky electrically conductive coating composition which comprises
   (a) a fluoroelastomer selected from highly fluorinated elastic copolymers,
   (b) a fluororesin selected from the group consisting of polytetrafluoroethylene; copolymers of tetrafluoroethylene and at least one other ethylenically unsaturated monomer selected from the group consisting of olefines, haloolefines and perfluoro(alkyl vinyl ethers); polychlorotrifluoroethylene; and polyvinylidene fluorides,
   (c) a coupling agent selected from the group consisting of
   a silane coupling agent of the formula:

$$R^1SiR^2{}_{3-a}R^3{}_a \qquad (I)$$

wherein $R^1$ is alkyl having at least one substituent selected from the group consisting of chlorine, amino, aminoalkyl, ureido, glicydoxy, epoxycyclohexyl, acryloyloxy, methacryloyloxy, mercapto and vinyl, or vinyl; $R^2$ and $R^3$ are each chlorine, hydroxy, $C_1$-$C_{10}$ alkoxy, $C_2$-$C_{15}$ alkoxy substituted alkoxy, $C_2$-$C_4$ hydroxyalkyloxy, or $C_2$-$C_{15}$ acyloxy; and a is 0, 1 or 2;
   a coupling agent of the formula:

$$T(OR)_4 \qquad (II)$$

wherein T is titanium, zirconium, hafnium or thorium; and R is alkyl, cycloalkyl or aryl, or its derivatives which is derived by reacting the orthoacid ester (II) and at least one compound having at least one functional group;
   $SnCl_4$;
   aluminum isopropylate, mono-sec-butoxyaluminum diiopropylate, aluminum sec-butylate, ethylacetoacetatealuminum diisopropylate and aluminum tris(ethylacetate); and magnesium alcholoates;
   (d) an electrically conducting material selected from the group consisting of carbon, graphite, gold, silver, copper, aluminum, titanium and anionic, monionic, cationic and amphoteric antistatic agents and
   (e) a liquid vehicle,
   wherein the weight ratio of the fluoroelastomer (a) and the fluororesin (b) is from 95:5 to 35:65, the weight ratio of the coupling agent (c) to the fluoroelastomer (a) is from 1:100 to 50:100, and the electrically conducting material is contained in such an amount that a coating film made from the composition has $10^8$ ohm-cm or less of the volume resistivity.

2. The coating composition of claim 1 wherein the fluoroelastomer is a copolymer of about 40–85 mol % vinylidene fluoride and about 60 to 15 mol % of at least one other fluorine-containing ethylenically unsaturated monomer copolymerizable therewith.

3. Tne coating composition of claim 2 wherein the fluorine containing ethylenically unsaturated monomer is selected from the group consisting of hexyfluoropropylene, pentafluoropropylene, trifluoroethylene, trifluorochloroethylene, tetrafluoroethylene, vinyl fluoride, perfluoro(methyl vinyl ether), perfluoro(ethyl vinyl ether), and perfluoro(propyl vinyl ether).

4. The coating composition of claim 1 which further comprises an amine selected from the group consisting of ethylamine, propylamine, butylamine, benzylamine, allylamine, n-amylamine, ethanolamine), diamines (e.g. ethylenediamine, trimethylenediamine, tetramethylenediamine, hexamethylenediamine, 3,9-bis(3-aminopropyl)-2,4,8,10-tetraoxaspiro[5.5]undecane and polyamines (e.g. diethylenetriamine, triethylenetetraamine, tetraethylenepentaamine, and pentaethylenehexaamine).

5. The coating composition according to claim 4 wherein the amine has at least one terminal amino group which directly bonds to an aliphatic hydrocarbon group.

6. The coating composition according to claim 4, wherein the amine has at least two terminal amino groups.

7. The coating composition according to claim 4, wherein the molar ratio of the coupling agent (c) to the amine is from 1:99 to 99:1.

8. The coating composition according to claim 1, which further comprises an inorganic fibrous material selected from the group consisting of glass fibers, carbon fibers, asbestos fibers and fibrous potassium titanate.

* * * * *